US011550749B2

(12) United States Patent  
Kumar et al.

(10) Patent No.: US 11,550,749 B2  
(45) Date of Patent: Jan. 10, 2023

(54) SERIAL DATA INTERFACE WITH REDUCED LOOP DELAY

(71) Applicants: STMicroelectronics International N.V., Geneva (CH); STMicroelectronics (Rousset) SAS, Rousset (FR)

(72) Inventors: Manoj Kumar, Greater Noida (IN); Kailash Kumar, Hazaribag (IN); Nicolas Demange, Saint-Maximin la Sainte Baume (FR)

(73) Assignees: STMicroelectronics International N.V., Geneva (CH); STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/143,679

(22) Filed: Jan. 7, 2021

(65) Prior Publication Data

US 2021/0248104 A1     Aug. 12, 2021

Related U.S. Application Data

(60) Provisional application No. 62/972,721, filed on Feb. 11, 2020.

(51) Int. Cl.  
*G06F 13/42*     (2006.01)  
*G06F 1/06*     (2006.01)

(52) U.S. Cl.  
CPC .......... *G06F 13/4291* (2013.01); *G06F 1/06* (2013.01)

(58) Field of Classification Search  
CPC .................. G06F 13/4291; G06F 13/4282  
See application file for complete search history.

(56) References Cited

U.S. PATENT DOCUMENTS

| 7,478,006 | B2 | 1/2009 | Odom |
| 9,916,278 | B2 | 3/2018 | Missoni et al. |
| 10,572,438 | B1* | 2/2020 | Mishra ............... G06F 1/12 |
| 2013/0195235 | A1* | 8/2013 | Ferris ................. H04L 7/0008 |
| | | | 375/362 |
| 2021/0248104 | A1* | 8/2021 | Kumar ................. G06F 1/06 |

FOREIGN PATENT DOCUMENTS

CN     209118268 U     7/2019

* cited by examiner

*Primary Examiner* — David E Martinez  
(74) *Attorney, Agent, or Firm* — Crowe & Dunlevy

(57) ABSTRACT

A serial peripheral interface (SPI) device includes a serial clock (SCK) pad receiving a serial clock, first and second Schmitt triggers directly electrically connected to the SCK pad to selectively respectively generate first and second clocks in response to rising and falling edges of the serial clock, first and second flip flops clocked by the first and second clocks to output bits of data to a data node, a multiplexer having an input coupled to the data node and an output coupled to driving circuitry, and driving circuitry transmitting data via a master-in-slave-out (MISO) pad.

20 Claims, 5 Drawing Sheets

SERIAL DATA INTERFACE WITH REDUCED LOOP DELAY

RELATED APPLICATION

This application claims priority to United States Provisional Application for Patent No. 62/972,721, filed Feb. 11, 2020, the contents of which are incorporated by reference in their entirety.

TECHNICAL FIELD

This disclosure is directed to the field of serial data transmission and, in particular, to a slave architecture for use in serial data transmission that has a sufficiently low delay between clock pulse receipt and data output to enable transmission modes in which data may be transmitted at either edge of the clock pulse.

BACKGROUND

Synchronous serial communication is utilized in many electronic devices. One such synchronous serial communications standard is known as the Serial Peripheral Interface (SPI). A conceptual version of architecture for implementing the SPI is shown in FIG. 1. Here, it can be seen that SPI utilizes a master unit 2 and a slave unit 8.

The master unit 2 includes a clock generator 3 that generates a serial clock SCK signal that is used to synchronize data transfers between the master 2 and slave 8, and is sent to the slave 8 by the SCK pad 4. The master 2 also includes digital logic 6 (including, for example, a shift register) which, during each clock cycle, sends a bit of data to the slave 8 by outputting the data bit to the master-out-slave-in (MOSI) pad 7, and receives a bit of data from the slave via the master-in-slave-out (MISO) pad 5.

The slave unit 8 receives the SCK signal via its own SCK pad 9, which is sampled by a flip flop FF to produce a SCK_Sample signal and used to clock digital logic 11 (including, for example, a shift register). During each clock cycle, the digital logic 11 receives a bit of input data from the master 2 via the MOSI pad 10, and outputs a bit of output data (generated by processing the input data) to the master 2 via the MISO pad 6.

The "loop" delay of the slave 8 is the sum of the delay in the path between the SCK pad 9 and the MISO pad 6, and defines the delay between receipt of a pulse of the serial clock SCK signal via the SCK pad 9 and the output of a next output data bit via the MISO pad 6. In order to enable full duplex SPI communication, the loop delay of the slave 8 should be such that the delay between the receipt of the pulse of the SCK signal and the output of a next data bit via the MISO pad 6 is less than one half the period of the SCK signal minus the setup time required (after transmission of a bit of output data) to ready the next bit of output data for the next pulse of the SCK signal. Mathematically, this means that it is desired for the following condition to be met:

$$Tpadins + Tpadouts < Tsck/2 - Tset$$

where Tpadins is the delay between the receipt of a pulse of the SCK signal and output of the SCK_Sample signal, Tpadouts is the delay between the SCK_Sample signal and completion of the output of the data bit by the digital logic 11 via the MISO pad 6, Tsck is the period of the SCK signal, and Tset is the setup time as defined above. Note that Tset can also be defined as the delay between the output of the current data bit by the digital logic 11 via the MISO pad 6 and the transition of the SCK signal to logic low.

A prior art slave 12 implementation is shown in FIG. 2. Here, the slave 12 receives at the input/output IO RING of the slave the SCK signal via its SCK pad 13. The SCK signal is used by a Schmitt trigger 14 to produce a ZOUTSCK signal, which is then level shifted to a lower voltage domain by a level shifter 15, and this level shifted version of the ZOUTSCK signal is labeled as a clock CLK signal and is passed to the core (controller). The CLK signal is inverted by an inverter 16, and a multiplexer 18 receives as input the CLK signal as well as the inverted version of the CLK signal. A clock phase signal (CPHA) and a clock polarity signal (CPOL) signal (which were used to define the format of the SCLK signal) are received by logic 17, which based thereupon generates a control signal EDGE for the multiplexer 18. Based on the EDGE signal, the multiplexer either outputs the CLK signal or the inverse of the CLK signal to the clock input of the flip flop 90. The data input of the flip flop 90 receives an input data bit (either from the master via the MOSI pad 24 or from the controller of the slave), and when clocked by output from the multiplexer 18, the flip flop 90 passes an output data bit at its Q output to generate a DATA_in signal which is input to digital logic 20 (which may be selectively enabled by the enable signal EN0) within the IO RING. The digital logic 20 may include, for example, a multiplexer, and upon receiving the DATA_in signal, provides a data bit output to the level shifter 21, which shifts the voltage of that data bit to a higher voltage domain. Driving circuitry 22 transmits the data bit from the level shifter 21 to the master via the MISO pad 23.

The loop delay of this prior art slave 12 implementation can be calculated as follows:

$$Tloop = Tschmittrx + TlsHtoL + Tclk\_Rc + Tinv + Tmux + Tff + Tdl + TlsLtoH + Tdri$$

where Tschmittrx is the delay between receipt of the SCK signal at the SCK pad and the output of the ZOUTSCK signal by the Schmitt trigger 14, TlsHtoL is the delay for the level shifter 15 to produce the CLK signal from the ZOUTSCK signal, Tclk_Rc is the resistive/capacitive RC delay of the line carrying the CLK signal from the level shifter 15 to the inverter 16 and multiplexer 18, Tinv is the delay between the inverter receiving the CLK signal and outputting the inverted version of the CLK signal, Tmux is the signal propagation delay through the multiplexer 90, Tff is the delay between when the flip flop 90 is clocked and when the DATA_in signal is output by the flip flop 90, Tdl is the propagation delay through the digital logic 20, TlsLtoH is the delay for the level shifter to shift the output of the digital logic 20 to the higher voltage domain, and Tdri is the sum of the propagation delay through the driving circuitry 22 as well as any pre-driving circuitry therein.

Unfortunately, this design is unable to meet the loop delay requirement expressed above for maximum SPI communication speed (e.g., high frequency full duplex communication mode), particularly when thick oxide devices are employed within the slave and when those devices are underdriven.

Therefore, further development of SPI systems are needed so as to permit the maximum SPI communication speed permitted by the SPI standard.

SUMMARY

Disclosed herein is a slave device for communication with a master device over a serial data bus. The slave device includes a serial clock input pad configured to receive a serial clock, and data sampling circuitry directly electrically connected to the serial clock input pad and operated by the serial clock. The data sampling circuitry is capable of sampling output data at each edge of the serial clock (and which edge the data sampling circuitry samples at is selectable and may be changed each period of the serial clock) and outputs the sampled output data to a digital circuit. Driving circuitry is configured to receive the sampled output data from the digital circuit and to output previously received sampled output data to the master device via a data output pad.

The data sampling circuitry includes a first Schmitt trigger configured to selectively generate a clock pulse in response to a rising edge of the serial clock, a first flip flop clocked by the clock pulse from the first Schmitt trigger and configured to receive the output data, a second Schmitt trigger configured to selectively generate a clock pulse in response to a falling edge of the serial clock, and a second flip flop clocked by the clock pulse from the second Schmitt trigger and configured to receive the output data. A logic signal generated by a logic circuit selects which Schmitt trigger and flip flop pair are selected (e.g., the logic signal selects the first Schmitt trigger and first flip flop for a given sampling operation, or selects the second Schmitt trigger and second flip flop for a given sampling operation). Outputs of the first and second flip flops are coupled at a node to produce the sampled output data to be output to the digital circuit.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 3:
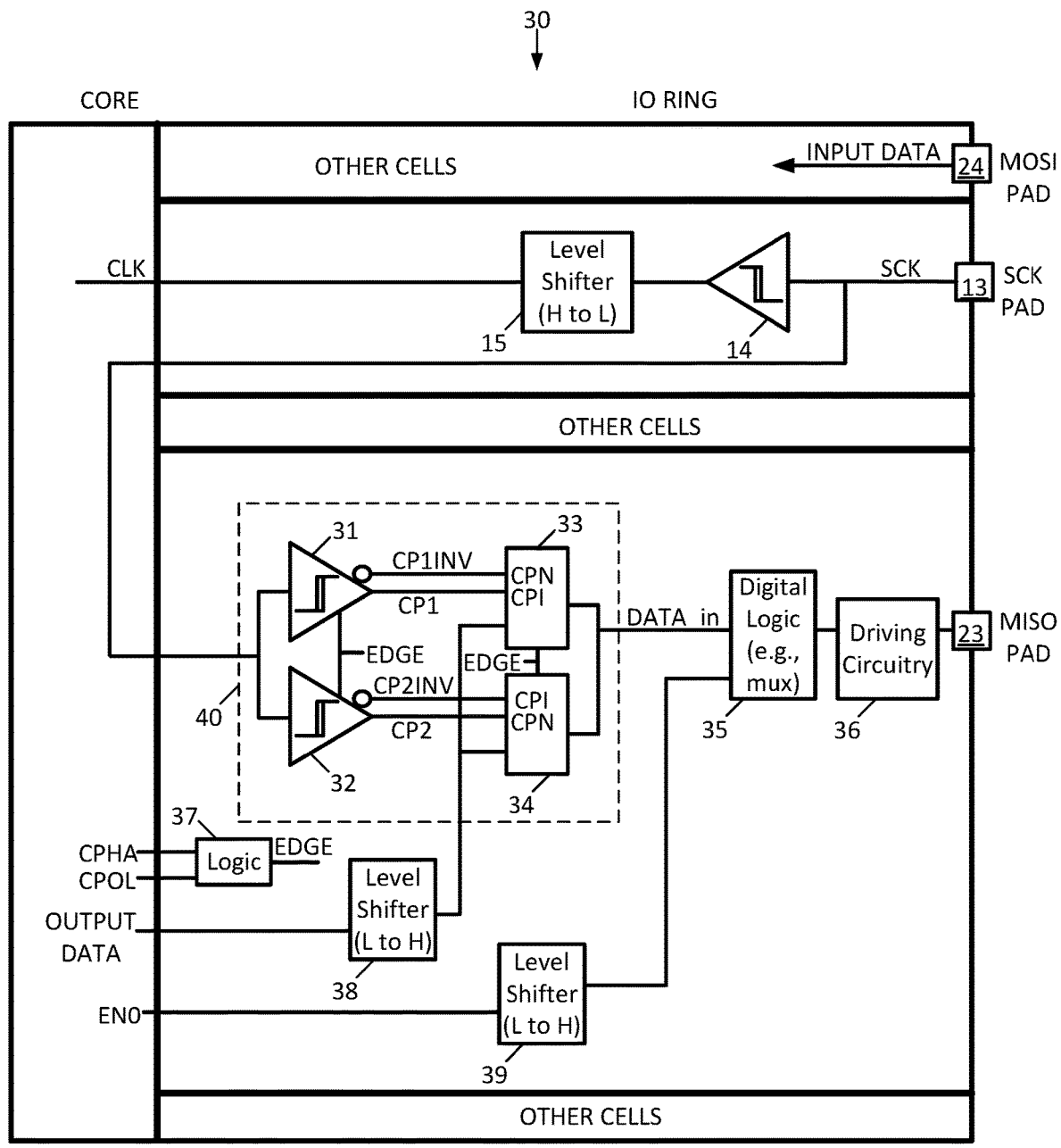
FIG. 3 is a block diagram of a first embodiment of a SPI slave in accordance with this disclosure.

Now described with reference to FIG. 3 is a new slave design 30 having a loop delay sufficiently low such that the maximum SPI communication speed permitted by the SPI standard can be achieved, but it should be understood that the principles described herein may be applied to any serial interface standard utilizing a serial clock for synchronization. In general, as compared to the prior art, this new slave design reduces the loop delay sufficiently to allow high frequency full duplex communication by directly routing the SCK signal to a pair of Schmitt triggers within data sampling circuitry without first level shifting SCK, and using the Schmitt triggers to generate clock signals for flip flops to enable selective sampling of data at either the rising and falling edge of the SCK signal, with the sampling edge being selectable and changeable once per pulse of the serial clock.

Note that the slave 30 is comprised of the cells labeled under the heading IO RING, and control circuitry labeled under the heading CORE. In detail, the slave 30 receives the SCK signal via the SCK pad 13. While the Schmitt trigger 14 and level shifter 15 are still used within the IO RING to produce CLK (for passage to the CORE) as in the prior art FIG. 2, note that the data sampling circuitry 40 (to be described below) does not operate based on the CLK signal. Instead, the SCK signal is directly routed through the IO RING and CORE to the data sampling circuitry 40 within the CORE.

The data sampling circuitry 40 includes a pair of Schmitt triggers 31 and 32 that receive the SCK signal. Logic circuitry 37 generates the control signal EDGE for the Schmitt triggers 31 and 32 from the CPHA and CPOL signals, and for the flip flops 33 and 34. The control signal EDGE is used to enable Schmitt trigger 31 and flip flop 33, or enable Schmitt trigger 32 and flip flop 34, depending upon the operation being performed and/or the output data (labeled as OUTPUT DATA) to be sent via the MISO pad 23.

When enabled, the Schmitt trigger 31 outputs a pulse signal CP1 and its inverse CP1INV on the rising edge of the SCK signal, and these signals in turn clock the flip flop 33, causing it to sample the OUTPUT DATA on the rising edge of the SCK signal and output that data as the DATA_in signal to the digital logic 35. When the Schmitt trigger 31 and flip flop 33 are enabled, the Schmitt trigger 32 and flip flop 34 are disabled.

When enabled, the Schmitt trigger 32 outputs a pulse CP2 and its inverse CP2INV on the falling edge of the SCK signal, and these signals in turn clock flip flop 34, causing it to sample the OUTPUT DATA on the falling edge of the SCK signal and output that data as the DATA_in signal to the digital logic 35. When the Schmitt trigger 32 and flip flop 34 are enabled, the Schmitt trigger 31 and flip flop 33 are disabled.

Therefore, collectively, the data sampling circuitry 40 is capable of outputting a new bit of the DATA_in signal (to be transmitted to the master via the MISO pad 23) at either edge of the SCK signal.

Digital logic 35, such as a multiplexer, upon receiving DATA_in, provides a data bit output to the driving circuitry 36, which transmits the data bit to the master via the MISO pad 23. Note that the digital logic 35 is enabled by the EN0 signal, after passage through the level shifter 39.

Figure 1:
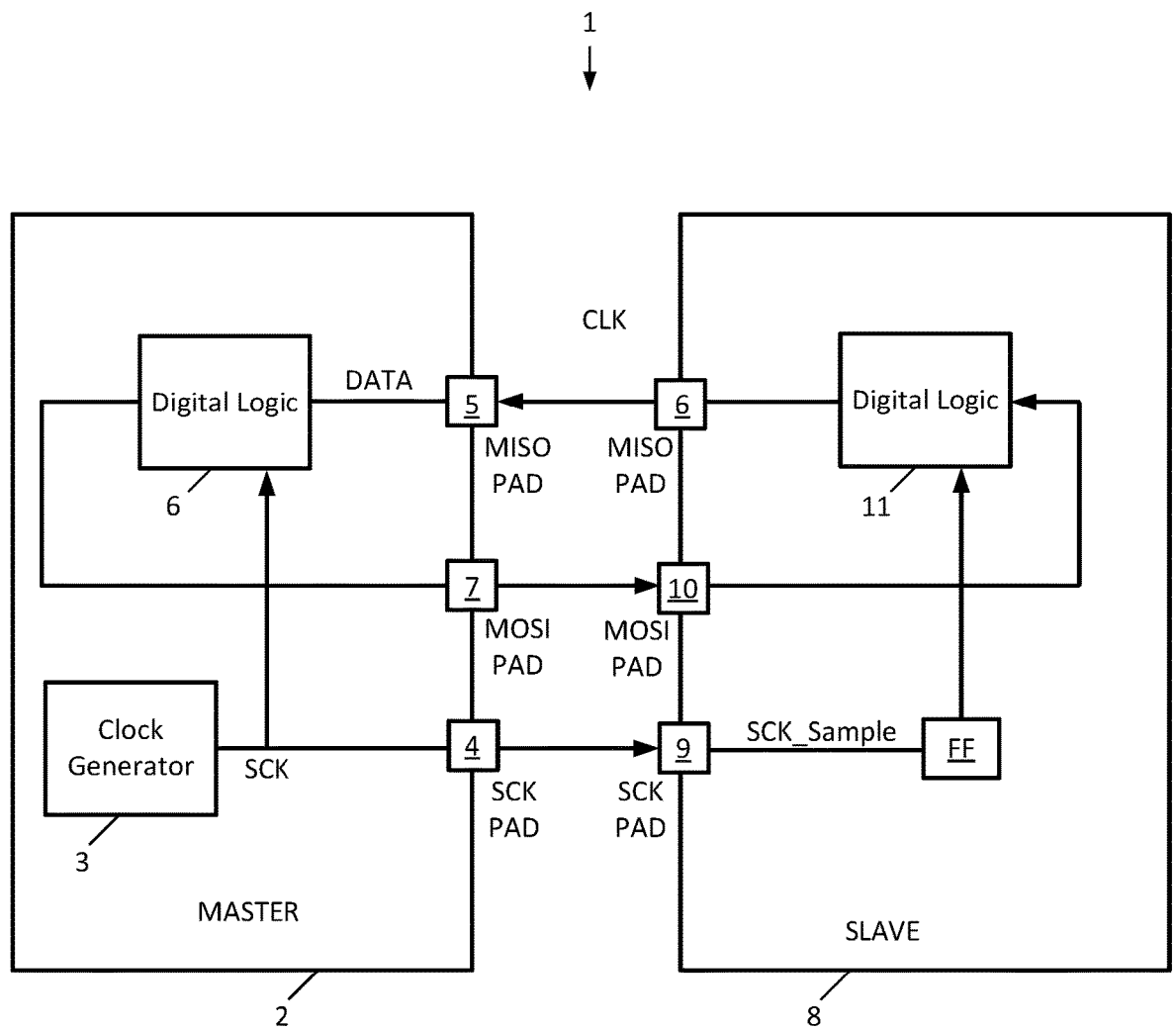
FIG. 1 is a block diagram of a conceptual version of the SPI architecture.
Figure 2:
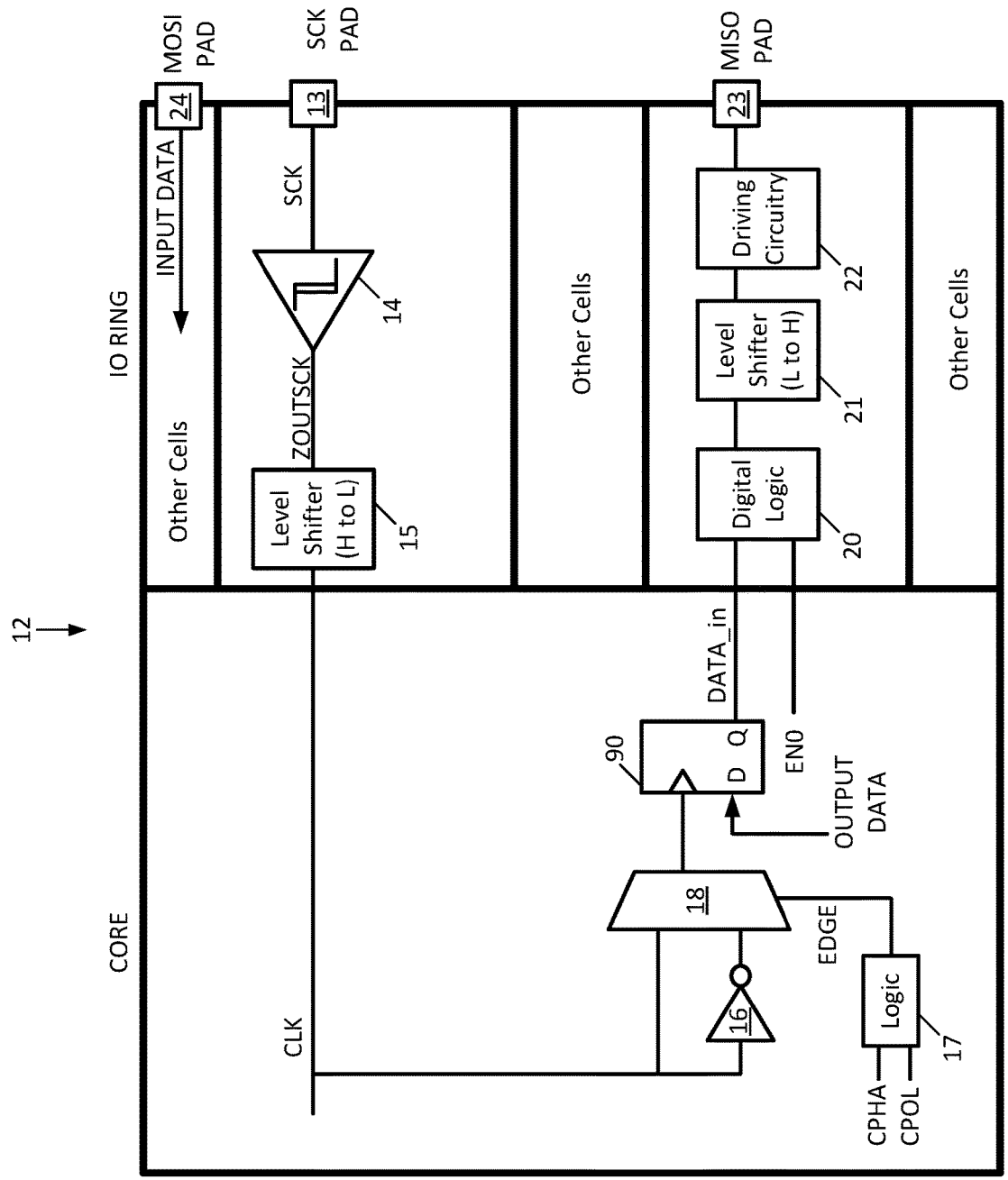
FIG. 2 is a block diagram of an actual prior art implementation of the SPI slave.

As compared to the prior art design of FIG. 2, the SCK signal is not level shifted, the delay due to the multiplexer switching between CLK and the inverse of CLK is eliminated, and the RC delay due to the long routing of the CLK signal is eliminated. As such, the loop delay of the slave design of FIG. 3 is:

$$Tloop = Tschmitt\_sclk + Tff + Tdl + Tdri$$

where Tschmitt_sclk is the propagation delay through the Schmitt triggers 31 and 32, Tff is the delay between when the flip flops 33 and 34 is clocked and when DATA_in is output, Tdl is the propagation delay through the digital logic 35, and Tdri is the sum of the propagation delay through the driving circuitry 36 as well as any pre-driving circuitry therein. This loop delay is sufficiently low to enable high frequency duplex communication, even when the transistors within the slave have thick gate oxides (e.g., gate oxides of a thickness of around 150 Å) and are underdriven (e.g., at around 1.8 V). For example, with the architecture of FIG. 2, the loop delay is around 11.5 ns, while with the design of FIG. 3, the loop delay is around 6.4 ns, which is less than the maximum loop delay allowable by the SPI specification for high frequency full duplex operation (around 6.56 ns).

Figure 4:
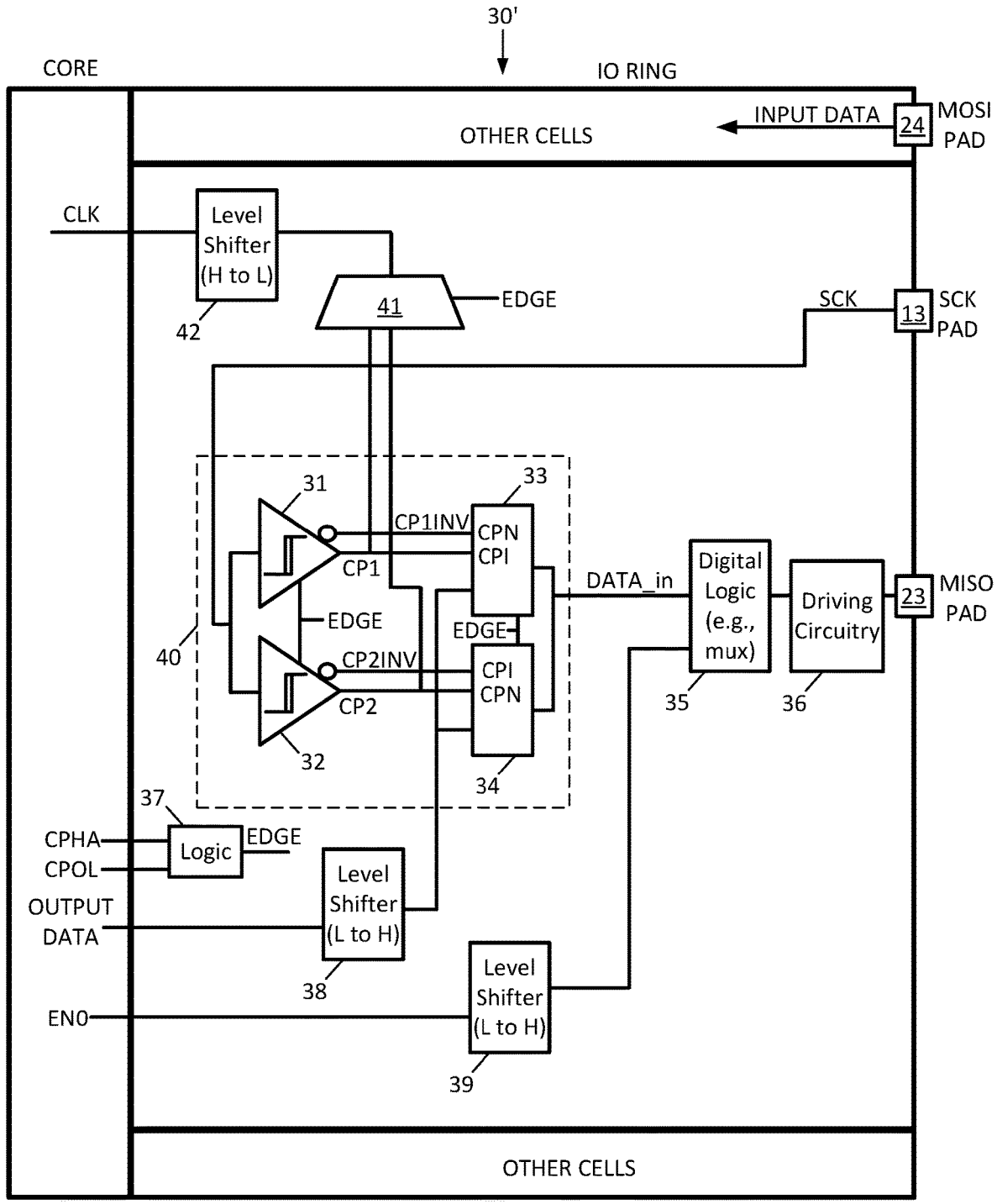
FIG. 4 is a block diagram of a second embodiment of a SPI slave in accordance with this disclosure.

A second embodiment of this slave 30' design is shown in FIG. 4. Here, note that the SCK signal is routed directly through the IO RING to the data sampling circuitry 40 without passing through the CORE. In addition, here, note that CLK is generated by passing output from a multiplexer 41 within the IO RING, that receives CP1 from the Schmitt trigger 31 and CP2 from the Schmitt trigger 32 as input and is controlled by control signal EDGE, through a level shifter 42. Otherwise, the slave 30' of FIG. 4 is the same as the slave 30 of FIG. 3 and operates the same.

The loop delay of the slave 30' is also:

$$Tloop=Tschmitt\_sclk+Tff+Tdl+Tdri$$

where Tschmitt_sclk is the propagation delay through the Schmitt triggers 31 and 32, Tff is the delay between when the flip flops 33 and 34 is clocked and when DATA_in is output, Tdl is the propagation delay through the digital logic 35, and Tdri is the sum of the propagation delay through the driving circuitry 36 as well as any pre-driving circuitry therein. As with the design of FIG. 4, the loop delay is around 6.4 ns.

In both the slave 30 and slave 30' described above, the loop delay Tloop is sufficiently low to meet the desired condition of the delay between the receipt of the pulse of the SCK signal and the output of a next data bit via the MISO pad 6 being less than one half the period of the SCK signal minus the setup time required (after transmission of a bit of output data) to ready the next bit of output data for the next pulse of the SCK signal. Mathematically, this means that the following condition described above is met:

$$Tpadins+Tpadouts<Tsck/2-Tset$$

Figure 5:
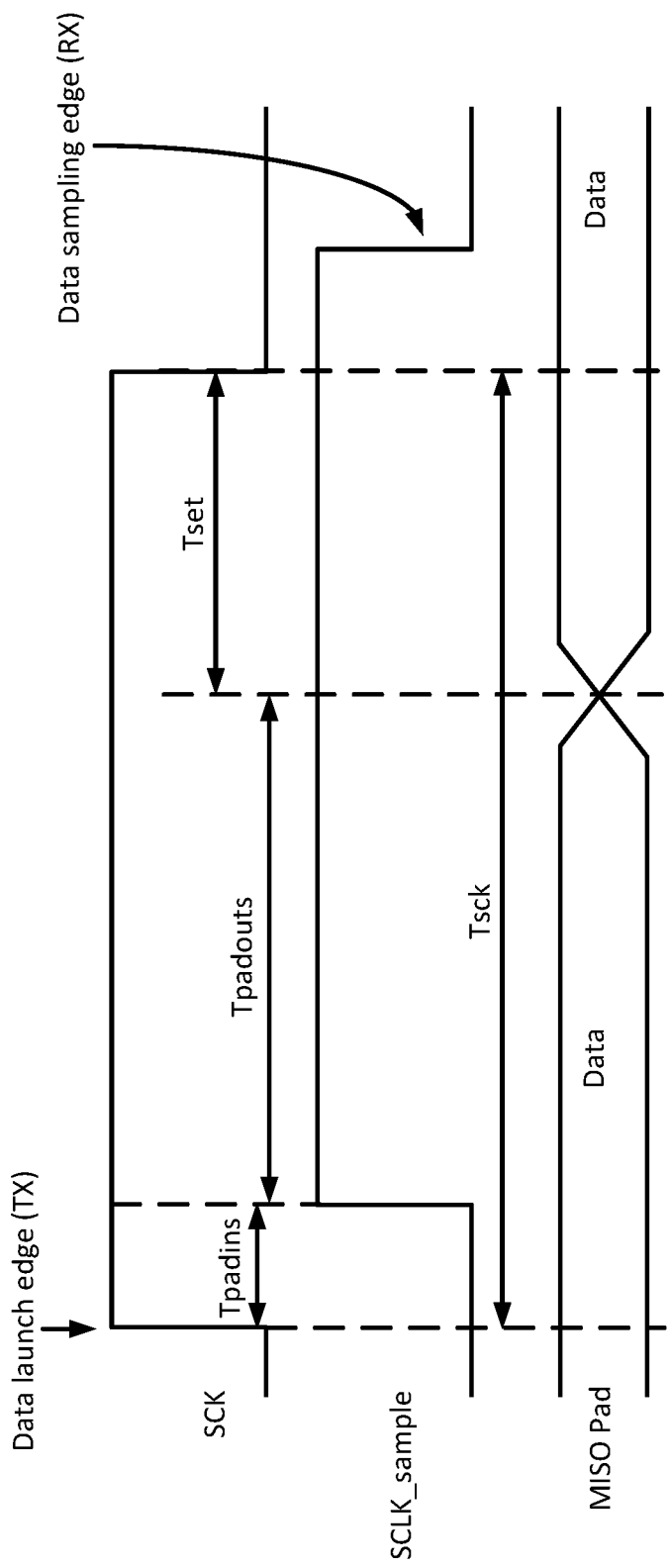
FIG. 5 is a timing diagram illustrating the SCK signal, SCLK_sample signal, and signal at the MISO pad in operation of the SPI slave devices of FIGS. 3-4.

This can be readily observed by referring to the timing diagram of FIG. 5. It can be observed that Tpadins is the delay between the rising edge of the SCK signal and the rising edge of the SCK_Sample signal, Tpadouts is the delay between the rising edge of the SCK_Sample signal and completion of the output of the data bit by the digital logic 11 via the MISO pad 6, Tsck is the period of the SCK signal, and Tset is the setup time as defined above (and as shown is the delay between the completion of the output of the current data bit by the digital logic 11 via the MISO pad 6 and the transition of the SCK signal to logic low).

It bears repeating that the principles disclosed herein are applicable to other serial interface standards, such as I²C, and are in no way limited to the SPI standard. Indeed, the examples shown are merely exemplary.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A slave device for communication with a master device over a serial data bus, the slave device comprising:
 a serial clock input pad configured to receive a serial clock;
 data sampling circuitry directly electrically connected to the serial clock input pad, and operated by the serial clock to sample output data at each rising and falling edge of the serial clock, and to output the sampled output data to a digital circuit, wherein the data sampling circuitry comprises:
 a first Schmitt trigger configured to selectively generate a first clock pulse in response to a rising edge of the serial clock;
 a first flip flop clocked by the first clock pulse from the first Schmitt trigger and configured to receive the output data;
 a second Schmitt trigger configured to selectively generate a second clock pulse in response to a falling edge of the serial clock; and
 a second flip flop clocked by the second clock pulse from the second Schmitt trigger and configured to receive the output data;
 wherein outputs of the first and second flip flops are coupled at a node to produce the sampled output data to be output to the digital circuit; and
 driving circuitry configured to receive the sampled output data from the digital circuit and to output previously received sampled output data to the master device via a data output pad.

2. The slave device of claim 1, further comprising a level shifter level configured to shift input data received from the master device via a data input pad from a lower voltage domain to a higher voltage domain; and wherein the output data is based upon the input data.

3. The slave device of claim 1, further comprising a multiplexer configured to receive input from the outputs of the first and second Schmitt triggers and provide output to a level shifter that shifts the output of the multiplexer from a higher voltage domain to a lower voltage domain to produce a clock signal to be routed to core circuitry.

4. The slave device of claim 3, further comprising logic circuitry configured to generate a control signal for the first Schmitt trigger, the second Schmitt trigger, and the multiplexer, from control signals defining a form of the serial clock.

5. The slave device of claim 1, further comprising logic circuitry configured to generate a control signal for the first and second Schmitt triggers, from control signals defining a form of the serial clock.

6. The slave device of claim 1, wherein the digital circuit receiving the sampled output data from the data sampling circuitry comprises a multiplexer.

7. The slave device of claim 1, wherein the direct electrical connection from the serial clock input pad to the data sampling circuitry is routed through core circuitry, and back into an input output ring, to the data sampling circuitry.

8. The slave device of claim 1, wherein the direct electrical connection from the serial clock input pad to the data sampling circuitry is routed solely through an input output ring.

9. The slave device of claim 1, further comprising a Schmitt trigger configured to receive the serial clock, and a level shifter configured to shift output from the Schmitt trigger from a higher voltage domain to a lower voltage domain to produce a clock signal to be routed to core circuitry.

10. The slave device of claim 1, wherein the slave device operates according to a Serial Peripheral Interface (SPI) standard.

11. A slave device for communication with a master device over a serial data bus, the slave device comprising:
 a serial clock input pad configured to receive a serial clock;

data sampling circuitry directly electrically connected to the serial clock input pad, and operated by the serial clock to sample output data at each rising and falling edge of the serial clock, and to output the sampled output data to a digital circuit, wherein the data sampling circuitry comprises:
  a first clock pulse generator configured to selectively generate a first clock pulse in response to a rising edge of the serial clock;
  a first storage element clocked by the first clock pulse from the first clock pulse generator and configured to receive the output data;
  a second clock pulse generator configured to selectively generate a second clock pulse in response to a falling edge of the serial clock; and
  a second storage element clocked by the second clock pulse from the second clock pulse generator and configured to receive the output data;
  wherein outputs of the first and second storage elements are coupled at a node to produce the sampled output data to be output to the digital circuit; and
driving circuitry configured to receive the sampled output data from the digital circuit and to output previously received sampled output data to the master device via a data output pad.

12. The slave device of claim 11, wherein:
the first clock pulse generator is further configured to generate an inverse of its clock pulse in response to the rising edge of the serial clock;
the first storage element is also clocked by the inverse of the clock pulse from the first clock pulse generator;
the second clock pulse generator is further configured to generate an inverse of its clock pulse in response to the falling edge of the serial clock; and
the second storage element is also clocked by the inverse of the clock pulse from the second clock pulse generator.

13. The slave device of claim 11, further comprising logic circuitry configured to generate an enable signal from a clock phase signal and a clock polarity signal; and wherein the first clock pulse generator, the first storage element, the second clock pulse generator, and the second storage element are enabled by the enable signal.

14. A slave device for communication with a master device using a Serial Peripheral Interface (SPI) standard, the slave device comprising:
  a serial clock input (SCK) pad receiving a serial clock from the master device;
  a master-out-slave-in (MOSI) pad receiving data from the master device;
  a level shifter shifting data received from the master device via the MOSI pad from a lower voltage domain to a higher voltage domain;
  a first Schmitt trigger directly electrically connected to the SCK pad to receive the serial clock and generate a first clock in response to a rising edge of the serial clock;
  a first flip flop receiving output data and being clocked by the first clock to output a bit of data to a data node;
  a second Schmitt trigger directly electrically connected to the SCK pad to receive the serial clock and generate a second clock in response to a falling edge of the serial clock;
  a second flip flop receiving output data and being clocked by the second clock to output a bit of data to the data node; and
  driving circuitry being coupled to a master-in-slave-out (MISO) pad and transmitting data from the data node to the master device via the MISO pad.

15. The slave device of claim 14, wherein the direct electrical connection from the SCK input pad to the first and second Schmitt triggers is routed through core circuitry, and back into an input output ring to the first and second Schmitt triggers.

16. The slave device of claim 14, wherein the direct electrical connection from the serial clock input pad to the first and second Schmitt triggers is routed solely through an input output ring.

17. The slave device of claim 14, further comprising logic circuitry configured to generate a control signal for the first and second Schmitt triggers, from control signals defining a form of the serial clock.

18. The slave device of claim 14, wherein: the first flip flop has a clock input directly electrically connected to output of the first Schmitt trigger to receive the first clock; and the second flip flop has a clock input directly electrically connected to output of the second Schmitt trigger to receive the second clock.

19. The slave device of claim 14, further comprising digital logic having an input coupled to the data node, and an output coupled to the driving circuitry.

20. The slave device of claim 19, wherein the digital logic comprises a multiplexer.

* * * * *